United States Patent [19]

Stokes et al.

[11] Patent Number: 5,344,064

[45] Date of Patent: Sep. 6, 1994

[54] METHOD FOR UNSOLDERING HEAT EXCHANGER END TANK FROM CORE HEADER PLATE

[76] Inventors: Dyrell K. Stokes, Rte. 3, Box 1354; Bennie J. Stokes, 1031 W. Verdine, both of Sulphur, La. 70663

[21] Appl. No.: 102,828

[22] Filed: Aug. 6, 1993

[51] Int. Cl.5 ............................................. B23K 1/018
[52] U.S. Cl. .................... 228/264; 228/191; 29/890.031
[58] Field of Search ................... 228/264, 191, 19; 29/890.031

[56] References Cited

U.S. PATENT DOCUMENTS

| | | | |
|---|---|---|---|
| 3,149,825 | 9/1964 | Watkins | 263/2 |
| 3,795,358 | 3/1974 | Sarnacki et al. | 228/19 |
| 4,371,106 | 2/1983 | Chapman | 228/19 |
| 4,567,632 | 2/1986 | Peters et al. | 29/890.031 |
| 4,588,300 | 5/1986 | Guy | 366/114 |
| 4,769,888 | 9/1988 | Desiro | 29/157.3 R |
| 4,830,259 | 5/1989 | Lewis | 228/19 |
| 5,148,969 | 9/1992 | Boucher et al. | 228/264 |
| 5,159,865 | 11/1992 | Hinckley | 83/16 |

Primary Examiner—P. Austin Bradley
Assistant Examiner—Jeffrey T. Knapp
Attorney, Agent, or Firm—Jacobson, Price, Holman & Stern

[57] ABSTRACT

A clamp structure is provided for removably rigid attachment to a fluid flow nipple projecting and opening outwardly from a wall portion of an end tank of a heat exchanger and structure is carried by the clamp structure for rigidly attaching a vibratory thereto, whereby the vibrator may be utilized to vibrate the clamp structure and in turn vibrate the fluid flow nipple and the associated end wall tank while heat is applied between the marginal edges of the end wall tank enjoying a solder seam with corresponding marginal edges of a heat exchanger core header plate, the vibration of the header tank during the unsoldering operation preventing a melted solder seam or joint being reformed behind a torch being moved along the solder joint or seam to melt the same.

5 Claims, 2 Drawing Sheets

METHOD FOR UNSOLDERING HEAT EXCHANGER END TANK FROM CORE HEADER PLATE

BACKGROUND OF THE INVENTION

1. Field of the Invention

This invention relates to a clamp device which may be clamped to a heat exchanger end tank outlet nipple or inlet nipple and have a vibrator rigidly mounted thereto for the purpose of vibrating the end tank as heat is applied by a torch to the soldered joining seam between the opposing edges of the end tank and the associated core end plate. By vibrating the end tank as the solder seam is melted, the melted solder is prevented from again solidifying and reforming as a soldered seam between the end tank and end wall behind the torch as the latter is moved along the solder seam to be melted.

2. Description of Related Art

Various different forms of apparatuses heretofore have been provided for efficiently removing a solder seam between previously solder joined surfaces. Examples of these previously known forms of apparatuses are disclosed in U.S. Pat. Nos. 3,149,825, 3,795,358, 4,371,106, 4,588,300, 4,769,888 and 5,148,969. However, these previously known structures are considerably more complex than the structure of the instant invention and perform the desired unsoldering or separating operation through the utilization of different methods.

SUMMARY OF THE INVENTION

The clamp of the instant invention is specifically designed to clampingly engage an inlet or outlet nipple of a heat exchanger tank from the inner and outer ends thereof and to have a vibrator rigidly attached thereto whereby the inlet or outlet nipple and the associated end tank will be vigorously vibrated.

During this vibrating operation heat is applied to and moved along the solder seal or joint between the opposing edges of the end tank and the associated core end plate. Vibration of the end tank through vibration of the nipple thereof is operative to cause sufficient constant movement between the opposing edges of the end tank and the core end plate between which the solder joint or seal has been melted in order to prevent the solder joint from reforming as the torch utilized to melt the solder of the seal or joint is moved along the latter. This is especially true if the portion of the seal joint being unsoldered is at least appreciably inclined and the torch being used to melt the solder joint is moved downwardly therealong from the upper end thereof.

The main object of this invention is to provide a method and apparatus for enabling the solder joint between the end tank of a heat exchanger and the associated core end plate to be unsoldered with a minimum amount of heat to thereby reduce the possibility of the heat of the unsoldering operation extending sufficiently inwardly along the core end plate to weaken or unsolder the solder joints between the end plate and the adjacent core tubes.

Another object of this invention is to provide an apparatus in accordance with the preceding object which may be utilized in conjunction with heat exchanger end tank outlet and/or inlet nipples of different sizes.

Another important object of this invention is to provide an apparatus which may be readily engaged with an associated heat exchanger end tank nipple as well as readily disengaged therefrom after the unsoldering operation has been completed.

A further object of this invention is to provide an apparatus in accordance with the preceding objects and in the form of a clamp for clampingly engaging the opposite ends of an end tank nipple and to which vibrators of various different manufacture may be rigidly attached.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof wherein like numerals refer to like parts throughout.

DESCRIPTION OF THE PREFERRED EMBODIMENT

Figure 1:
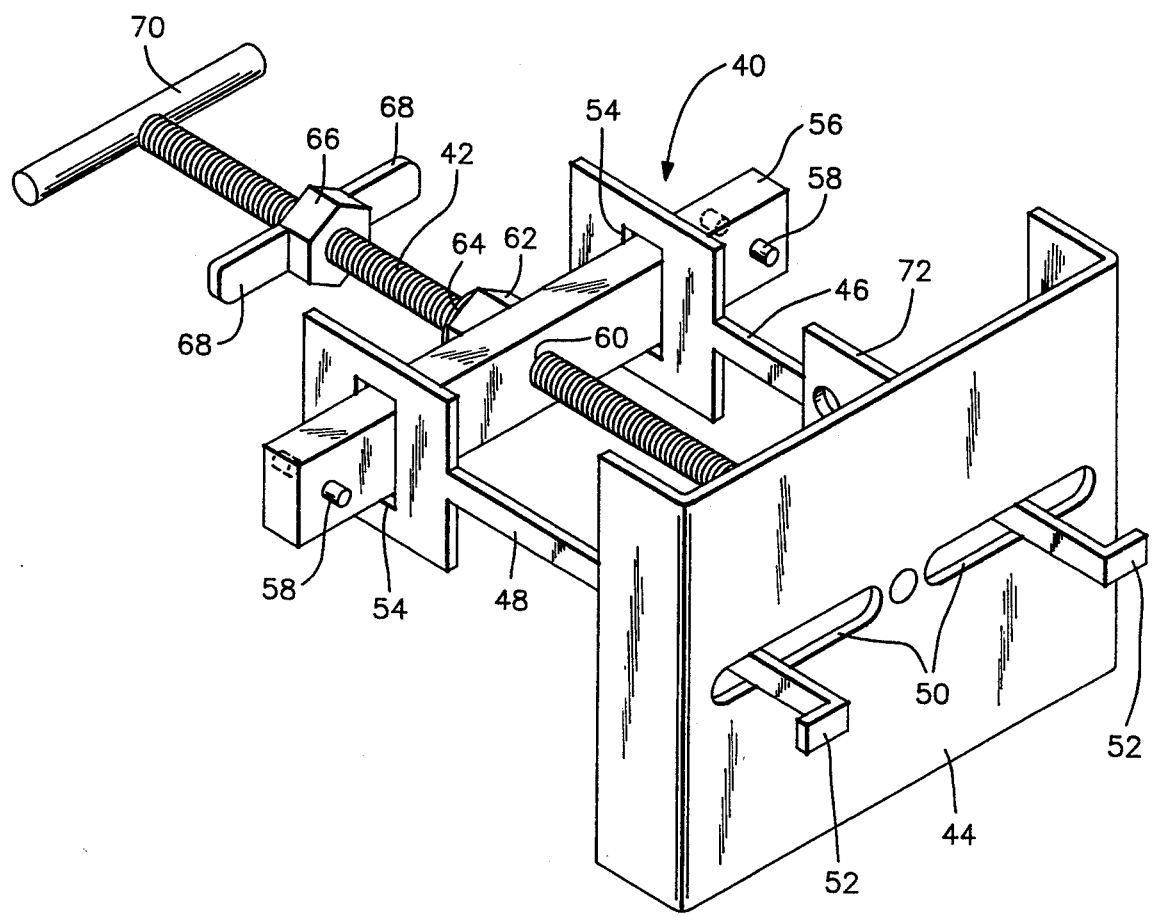
FIG. 1 is a perspective view of the heat exchanger end tank nipple engaging clamp structure comprising the apparatus of the instant invention.

Referring now more specifically to the drawings the numeral 10 generally designates a conventional form of radiator or heat exchanger including a core assembly 12 composed of a plurality of tubes 14 whose upper and lower ends are secured (usually by soldering) through upper and lower end plates 16. The lower end of the core assembly and the associated end plate not being illustrated. The upper end of the radiator 10 is closed through the utilization of downwardly opening upper end tank 18 and the lower end of the core assembly is closed through the utilization of a similar but upwardly opening end tank (not shown). The upper end tank 18 includes a filler neck 20 with which a removable cap 22 is engaged and also includes a coolant return nipple 24 projecting and opening outwardly from the side wall 26 of the upper end tank 18, the nipple 24 usually including an inner end outwardly directed circumferential flange 28 soldered to the inner surface of the wall 26.

The various vertical walls of the upper end tank 18 include lower marginal edges 30 which are conventionally soldered within opposing grooved marginal edges of the header or end plates 16.

The foregoing is to be considered as a description of a conventional form of radiator and/or heat exchanger.

When it is desired to repair the radiator 10, and particularly if the tubes 14 thereof need to be cleaned out, at least the upper end tank is removed. In order to effect removal of the upper end tank 18, heat is applied to the solder seam between the opposing portions of the margins 30 and 32 usually through the utilization of a gas torch 34.

If too much heat is applied to the opposing margins 30 and 32 excess heat travels laterally across the header plate 16 and may result in the solder connections between the adjacent tube ends and the header plate 16 being melted. Accordingly, it is imperative that when unsoldering the solder seam between the adjacent marginal portions 30 and 32 that excess heat is not used. However, when only minimally sufficient heat is used to melt the solder seal between the adjacent marginal portions 30 and 32, as the torch 34 is moved along a soldered seam to unsolder the latter, the melted solder behind the torch tends to resolidify and resolder the seam. Accordingly, in many instances the task of unsoldering the solder seam between the adjacent marginal portions 30 and 32 is highly time consuming. Therefore, radiator repair persons sometimes tend to use more heat than is necessary to unsolder the solder seal or connection between the adjacent marginal portions 30 and 32 resulting in at least the upper ends of some of the adjacent tubes 14 being unsoldered from the header plate 16, repair of these unsoldered tubes 14 being even more time consuming than if more time and less heat had been used in unsoldering the solder seam between the adjacent marginal portions 30 and 32.

Referring now more specifically to the drawings the numeral 40 generally designates a clamp structure incorporating an elongated central member having a first abutment member 44 in the form of an abutment plate mounted on one end of the central member for relative rotation therebetween, the central member 42 comprising a threaded shaft and the abutment member 44 comprising an abutment plate disposed of substantially normal to the longitudinal center line of the threaded shaft 42.

Further, the clamp structure 40 includes a pair of second elongated abutment members 46 and 48 which generally parallel the central member 42 and are disposed on opposite sides thereof. The second elongated abutment members 46 and 48 include opposite ends and one pair of corresponding ends of the abutment members 46 and 48 extend through lengthwise aligned slots 50 formed in the abutment member 44 on opposite sides of the adjacent end of the central member 42 and include outturned terminal ends 52. The other pair of ends of the abutment members 46 and 48 include rectangular openings 54 formed therein and the opposite ends of a transverse force member 56 are slidingly received through the openings 54, the terminal ends of the force member 56 including outwardly projecting abutment pins 58 whereby the corresponding ends of the abutment members 46 and 48 are held captive on the opposite ends of the force member 56.

The longitudinal central portion of the force member 56 has a threaded bore 60 formed therethrough and also an internally threaded nut 62 welded thereon, the threaded shaft 42 being threadedly passed through the nut 62 and the threaded bore 60 with a pair of washers 64 being disposed on the shaft 42 to the side of the nut 62 remote from the force member 56.

A jam nut 66 is threaded on the end portion of the shaft 42 remote from the abutment member 44 and includes oppositely outwardly projecting wings 68 in order to facilitate hand turning of the jam nut 66. Further, the terminal end of the shaft 42 remote from the abutment member 44 includes a hand engagable cross head 70 to facilitate turning of the shaft 42 relative to the force member 56 and the abutment member 44. Finally, the abutment member or plate 44 includes an apertured mounting ear 72 supported therefrom by which an apertured mounting lug 74 of a pneumatic vibrator 76 may be rigidly attached to the clamp structure 40 through the utilization of a threaded bolt 78.

Figure 2:
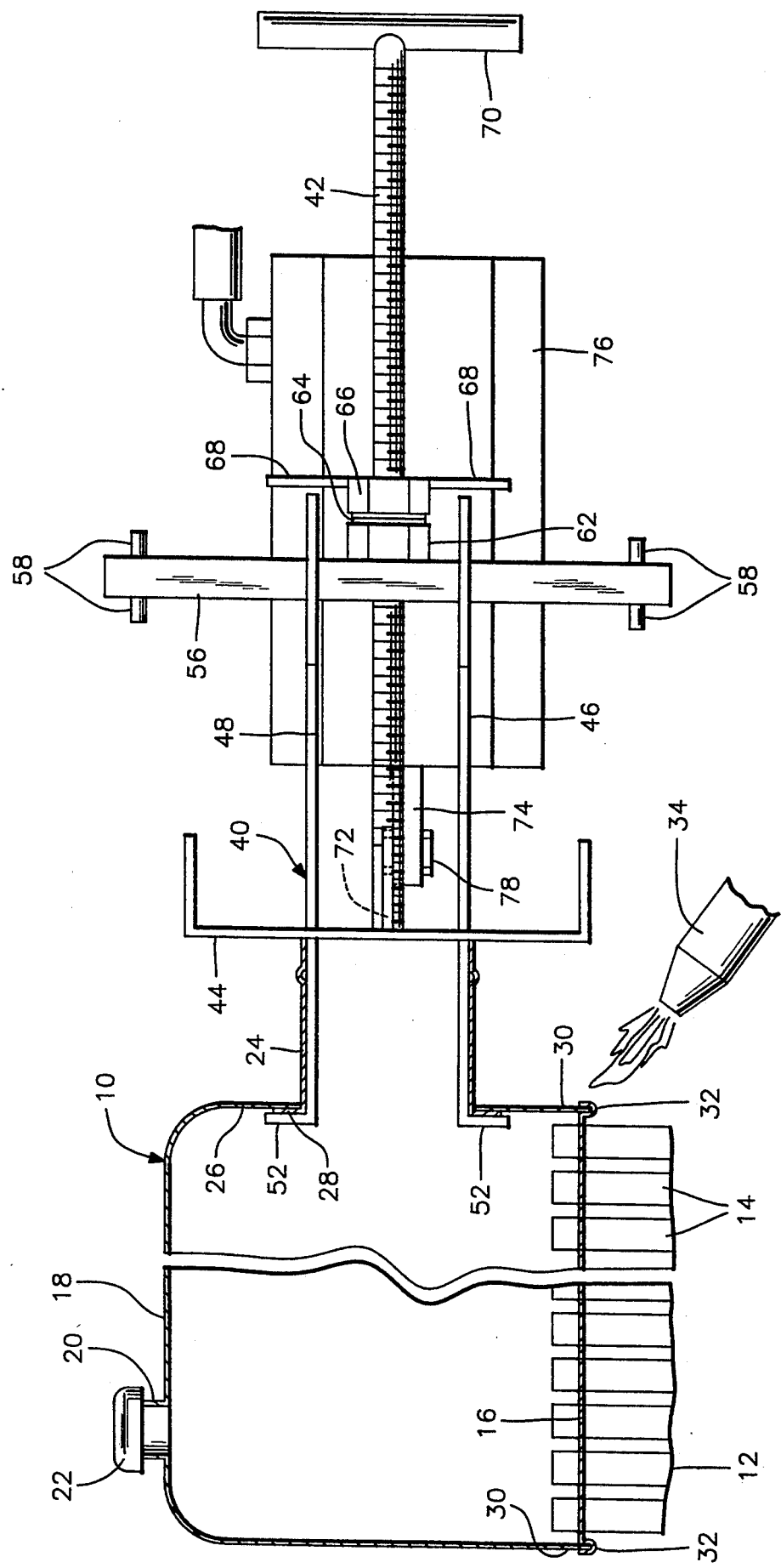
FIG. 2 is a fragmentary vertical sectional view of a radiator end tank and adjacent portions of the heat exchanger core, the end tank including a return fluid nipple projecting and opening outwardly therefrom with which a vibrator equipped clamp of the instant invention is clampingly engaged and illustrating the manner in which desoldering heat may be applied to the solder seal joint between adjacent edges of the end tank and core header plate.

When it is desired to effect removal of the upper end tank 18, the clamp structure 40 is operatively associated with the nipple 24 in the manner illustrated in FIG. 2 of the drawings with the outturned terminal ends 52 abutted against the inner surfaces of the flange 28 and the side of the abutment member or plate 44 opposing the outturned terminal ends 52 abutted against the outer end of the nipple 24, the cross head 50 being suitably tightened to pull the force member 56 toward the cross head 70 and to thus tightly clamp the opposite ends of the nipple 24 between the outturned terminal ends 52 and the abutment member 44. Then, the jam nut 66 may be tightened against the washers 66 and the nut 62 so that the tightened adjustment of the clamp structure 44 may be retained even when the pneumatic vibratory 76 is actuated.

After the clamp structure 40 has been operatively engaged with the inlet nipple 24 in the manner illustrated in FIG. 2, the gas torch 34 may be adjusted to provide the minimal heat required and slowly moved along the solder seal between the marginal portions 30 and 32. As one portion of the solder seam is melted, vibration of the upper end tank 18 will cause slight movement between the unsoldered portions 30 and 32 and prevent resolidification of the solder to reform a partial solder joint as behind the torch 34 as the latter is moved along the solder seam being unsoldered. In this manner, the end tank 18 may be quickly removed from the header plate 16 without any portion of the unsoldered seal joint resoldering the end tank 18 to the header plate and with a minimum amount of heat to thereby prevent unsoldering of some of the adjacent tubes 14 from the header plate 16.

Of course, if it is desired to also remove the lower end tank (not shown) the same process is used with the clamp structure 40 operatively associated with the outlet neck (not shown) of the lower tank.

It is further pointed out that even more reliable usage of the clamp structure 40 is realized if each straight soldered seam to be unsoldered is at least appreciably inclined before the unsoldering operation is begun and the torch 34 is moved downwardly along that solder seam.

Inasmuch as one pair of ends of the abutment members 46 are both slidably and longitudinally shiftably received through the slots 50 and the other pair of ends of the abutment members 44 are slidably along the force member 56, the spacing between the ends of the anchor members 46 provided with the outturned terminal ends 50 may be adjusted according to the inside diameter of the associate nipple 24. Accordingly, the clamp structure 40 may be used in conjunction with various different size radiators and heat exchangers. Furthermore, depending upon the wall thickness of the end tank 18, the vibrator 76 to be used in conjunction with the clamp structure 40 may be selected as to its vibration capacity.

The foregoing is considered as illustrative of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. The method of unsoldering a heat exchanger end tank from a core end plate of said heat exchanger in a manner to effect the desired unsoldering operation with a minimum amount of heat and thus little likelihood of unsoldering adjacent core tube ends from the end plate and wherein said end tank includes a liquid flow tubular nipple projecting and opening outwardly through a selected wall portion of said end tank, said method including providing an elongated clamp assembly defining a longitudinal axis and having radially outwardly shiftable abutment members at one end including first abutment surface means facing the other end, second abutment surface means intermediate said ends and facing said one end and with said first and second abutment surface means being relatively adjustable toward and away from each other, said method including inserting said radially outwardly shiftable abutment members through said nipple from the exterior of said end tank and with said abutment members in radially retracted positions, radially expanding said abutment members into position with said first abutment surface means opposing the inner end of said nipple, relatively shifting said first and second abutment surfaces toward each other in order to tightly clamp the inner and outer ends of said nipple therebetween, rapidly vibrating said clamp assembly, applying sufficient local heat gradually along an elongated solder seam connection between said end tank and core end plate to locally melt the solder of said seam connection.

2. The method of claim 1 wherein said steps of vibrating and applying heat are carried out while said seam connection is in an inclined position and said application of heat is carried out by moving said local heat downwardly along said inclined seam connection.

3. The method of unsoldering a heat exchanger end tank from a core end plate of said heat exchanger in a manner to effect the desired unsoldering operation with a minimum amount of heat and thus little likelihood of unsoldering adjacent core tube ends from the end plate and wherein said end tank includes a liquid flow tubular nipple projecting and opening outwardly through a selected wall portion of said end tank, said method including rigidly attaching a vibrator to said nipple for vibrating the same, and applying sufficient local heat gradually along an elongated solder seam connection between said end tank and said core end plate sufficient to locally melt the solder of said seam connection.

4. The method of claim 3 wherein said steps of vibrating and applying heat are carried out while said seam connection is in an inclined position and said application of heat is carried out by moving said local heat downwardly along said inclined seam connection.

5. The method of claim 3 wherein said step of rigidly attaching a vibrator to said nipple includes the step of removably rigidly attaching said vibrator to said nipple.

* * * * *